United States Patent
Eastham et al.

(10) Patent No.: US 7,496,794 B1
(45) Date of Patent: Feb. 24, 2009

(54) CREATING LIGHTWEIGHT FAULT ANALYSIS RECORDS

(75) Inventors: Paul C. Eastham, Mountain View, CA (US); George Cabrera, III, San Francisco, CA (US); David Grunwald, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 475 days.

(21) Appl. No.: 11/332,031

(22) Filed: Jan. 13, 2006

(51) Int. Cl.
*G06F 11/00* (2006.01)
(52) U.S. Cl. .......................................... 714/37; 714/38
(58) Field of Classification Search ....................... None
See application file for complete search history.

(56) References Cited

U.S. PATENT DOCUMENTS

| | | | |
|---|---|---|---|
| 6,681,348 B1 | 1/2004 | Vachon | |
| 6,738,928 B1 * | 5/2004 | Brown | 714/26 |
| 6,763,517 B2 | 7/2004 | Hines | |
| 7,240,240 B2 * | 7/2007 | Balakrishnan et al. | 714/15 |
| 7,257,743 B2 * | 8/2007 | Glerum et al. | 714/48 |
| 2004/0250170 A1 * | 12/2004 | Glerum et al. | 714/38 |

OTHER PUBLICATIONS

"Core File Format", Retrieved Nov. 8, 2005 from http://publib16.boulder.ibm.com/pseries/en_US/files/aixfiles/core.htm.

* cited by examiner

*Primary Examiner*—Christopher S McCarthy
(74) *Attorney, Agent, or Firm*—Blakely, Sokoloff, Taylor & Zafman LLP (57) ABSTRACT

Systems and methods of performing lightweight fault monitoring and analysis are described. In certain embodiments, the lightweight fault monitoring and analysis system and method include a crash dump component operable to generate a lightweight core file for a machine without generating a complete core file. The lightweight core file is smaller in size than a complete core file and contains information relevant for fault monitoring and analysis. The lightweight core has a data structure portion reflecting the state of only a portion of actual working memory at the time of a problem. The lightweight core file contains both regions in memory specific to the problem encountered and some standard regions.

26 Claims, 7 Drawing Sheets

CREATING LIGHTWEIGHT FAULT ANALYSIS RECORDS

FIELD

At least one embodiment of the present invention pertains to computer systems, and more particularly, to systems and methods of creating lightweight fault analysis records.

BACKGROUND

An operating system of a computer system typically generates a "core file" when the operating system recognizes a system crash or internal failure. These files are also called "core dumps" or "crash dumps," and are used for fault analysis and to debug a program or operating system that encountered a problem. A core dump generally represents the complete, unstructured state of the program or operating system memory at the time of a crash.

Core files can prove to be effective debugging aids in several situations. Core files allow a user to save a crash for later analysis or comparison with other crashes. A core file can be several Gigabytes in size depending on the memory size of the crashing device or program memory size. The size of these full core files can make it cumbersome to isolate the crash triggering fault that caused the internal failure. The size also makes it cumbersome to transmit the file over communication links. Furthermore, because the memory of a device or the program that encountered a problem can be very large in size, it can take a very long time to create the core dump. As the core dump is being written, any changes to the memory of the device will result in an inconsistent picture of the memory that is nearly impossible to interpret. Therefore, core files are typically only written out when the memory can be safely locked down for a period of time, thus causing downtime of the computer system.

Further, there are many cases in which a problem with the operating system is not serious enough to require a reboot. However, because a core dump may be useful or needed to debug the problem, a crash must typically be caused to allow the core file to be created. This causes unnecessary downtime and leads to inefficiency.

SUMMARY

Systems and methods of performing lightweight fault monitoring and analysis are described. In certain embodiments, the lightweight fault monitoring and analysis system and method include a crash dump component operable to generate a lightweight core file for a machine without generating a complete core file. The lightweight core file is smaller in size than a complete core file and contains information relevant for fault monitoring and analysis. The lightweight core file contains both selected regions in working memory specific to the problem and some standard regions as well, for use in debugging the problem that was encountered.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Systems and methods for generating lightweight fault analysis records, called a "lightweight core file", are described herein. In certain embodiments, the lightweight core file is smaller in size than a complete core file and contains information relevant for fault monitoring and analysis. The lightweight core file contains both user specified regions in working memory and program memory and some standard regions, both especially selected for use in debugging. Also, a lightweight core file can be generated without generating a complete core file. The lightweight core file can be generated by using one or more software routines that extract specific data segments from memory upon corruption in a process or even when there is no corruption.

As discussed herein, the lightweight core file has several advantages over a complete crash dump file. A lightweight core file contains information relevant for debugging and not just the entire contents of physical memory or program memory as typically contained in a complete core file. The lightweight core file contains both selected regions in memory that are specified by a user, such as an engineer or a programmer, and some standard regions, for use in debugging. Also, a lightweight core file does not require a prolonged system pause to be generated and/or transmitted to the end-user. According to certain embodiments, a lightweight core file requires exclusive use of the machine processor that may generate a very brief system pause that may not even be noticed by a user of the machine. Furthermore, generation of a lightweight core file does not require generation of a full core file first. Also, a lightweight core file is much smaller in size than the core file and therefore, can be easily transmitted. A lightweight core file may be analyzed locally or transmitted over a communication link for analysis by a computer or operating system vendor, creator, etc. (known as an "analyst" herein). Other further advantages and characteristics of the lightweight core file are described herein.

Figure 1:
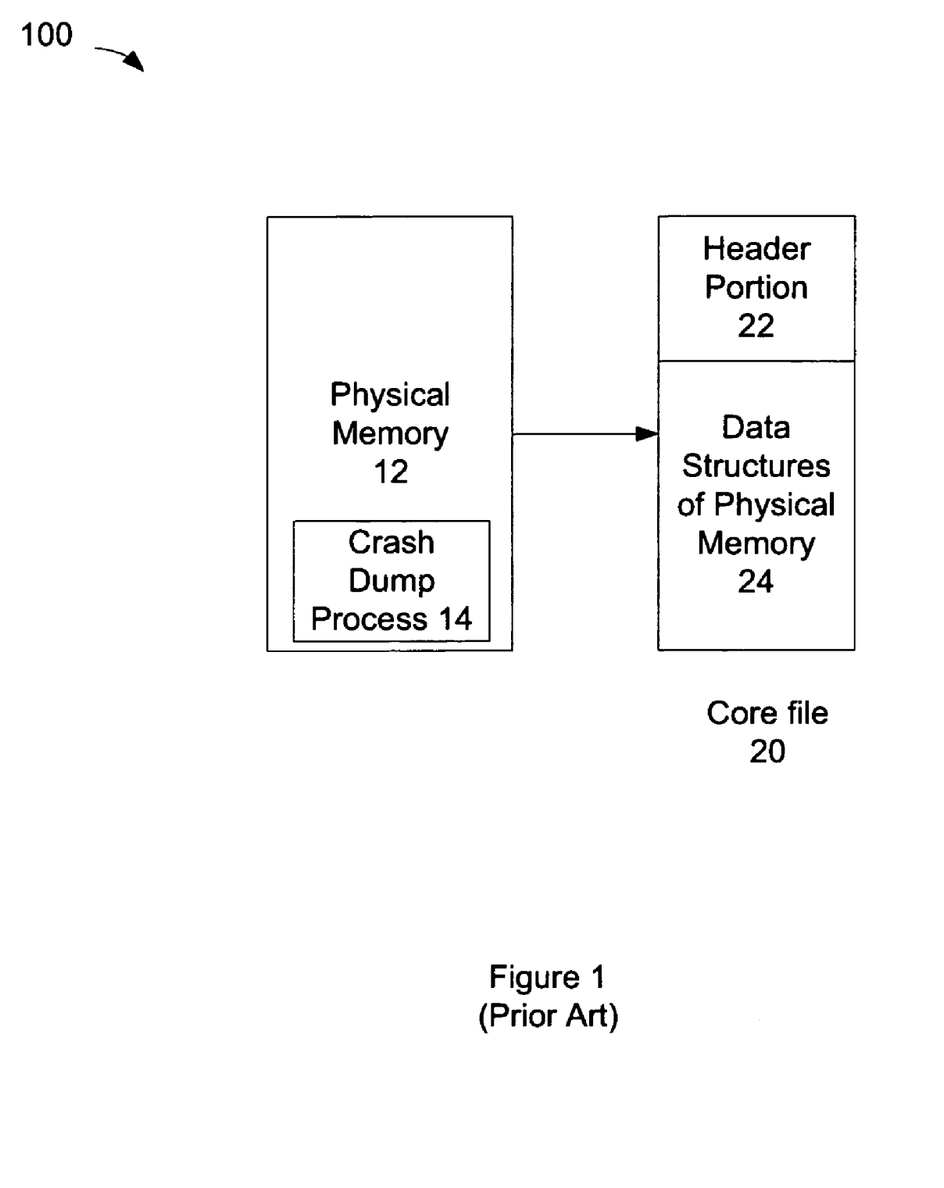
FIG. 1 is a block diagram of a machine having a physical memory and a crash dump file.

FIG. 1 illustrates an example of a prior art system 100, in which a crash dump process 14 in a physical memory 12 of a machine or computer system is used to generate a core file 20. The core file 20 typically includes a referencing or header portion 22 and data structures 24 of the physical memory.

Figure 2:
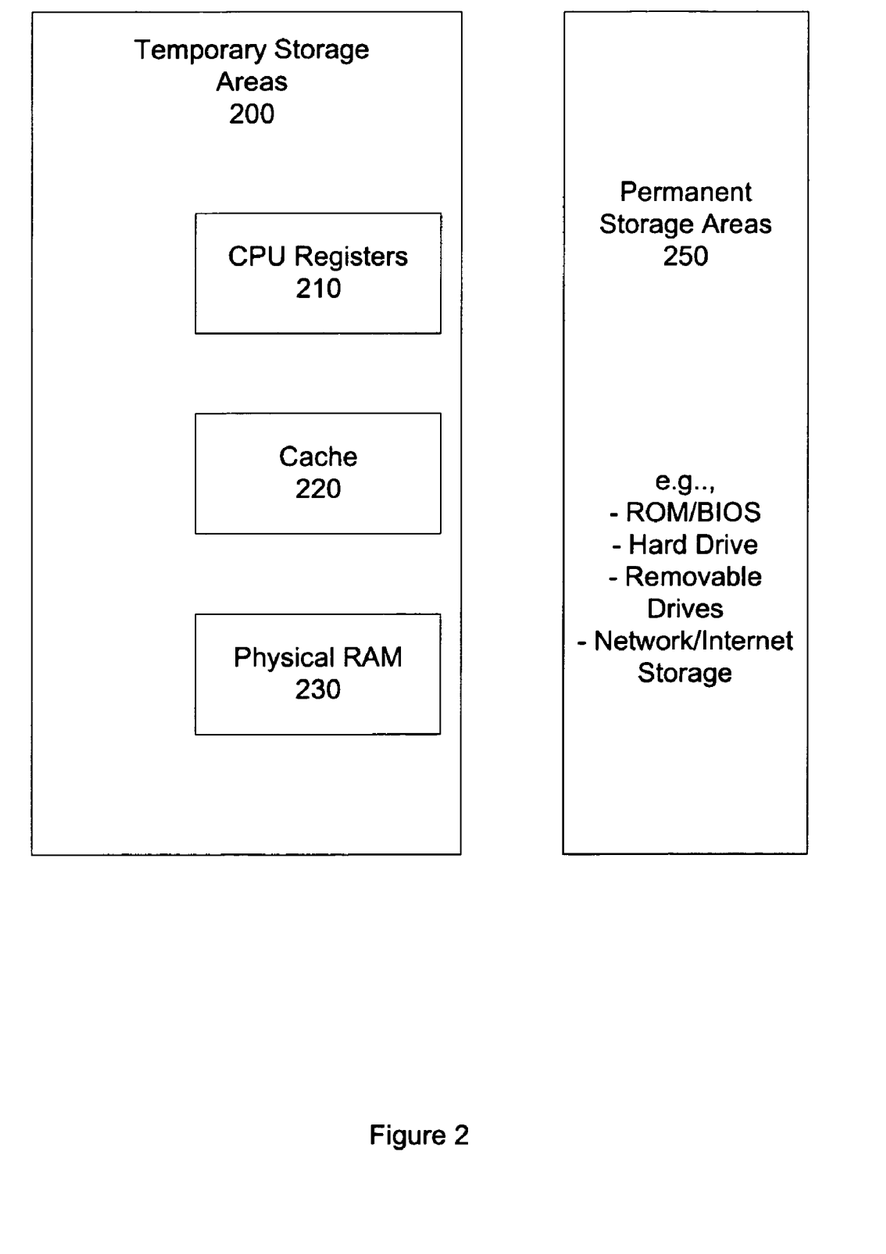
FIG. 2 illustrates the types of memory included in many computer systems.

FIG. 2 illustrates the typical storage areas of a machine, such as a computer. Most computers include several kinds of temporary memory: registers 210 in the processor, processor caches 220 (generally some kind of static RAM) both inside and adjacent to the processor, and main memory 260 (generally dynamic RAM) which the processor can read and write to directly and relatively quickly. The processor registers 210 are memory slots on the actual processor of the machine, in which small amounts of data is typically stored to avoid overhead of retrieving the data from normal memory. The main memory includes a physical RAM 230. Most machines also include some form of non-volatile storage area 250. The most common form is disk storage. Other forms include ROM/BIOS, removable drives, network/Internet storage, etc.

As shown in FIG. 1, generating the core file involves using only the contents of the main memory of a machine. Accordingly, data from other areas of memory does not generally make its way into the core file. For instance, the processor registers 210 store many commonly used values, such as, the values being used in the midst of a calculation at a given point in time. Most, but not all, modern computer architectures have a "load-store architecture." This means, that they move data from the main memory into registers, operating on them, then moving the result back into main memory.

Figure 3:
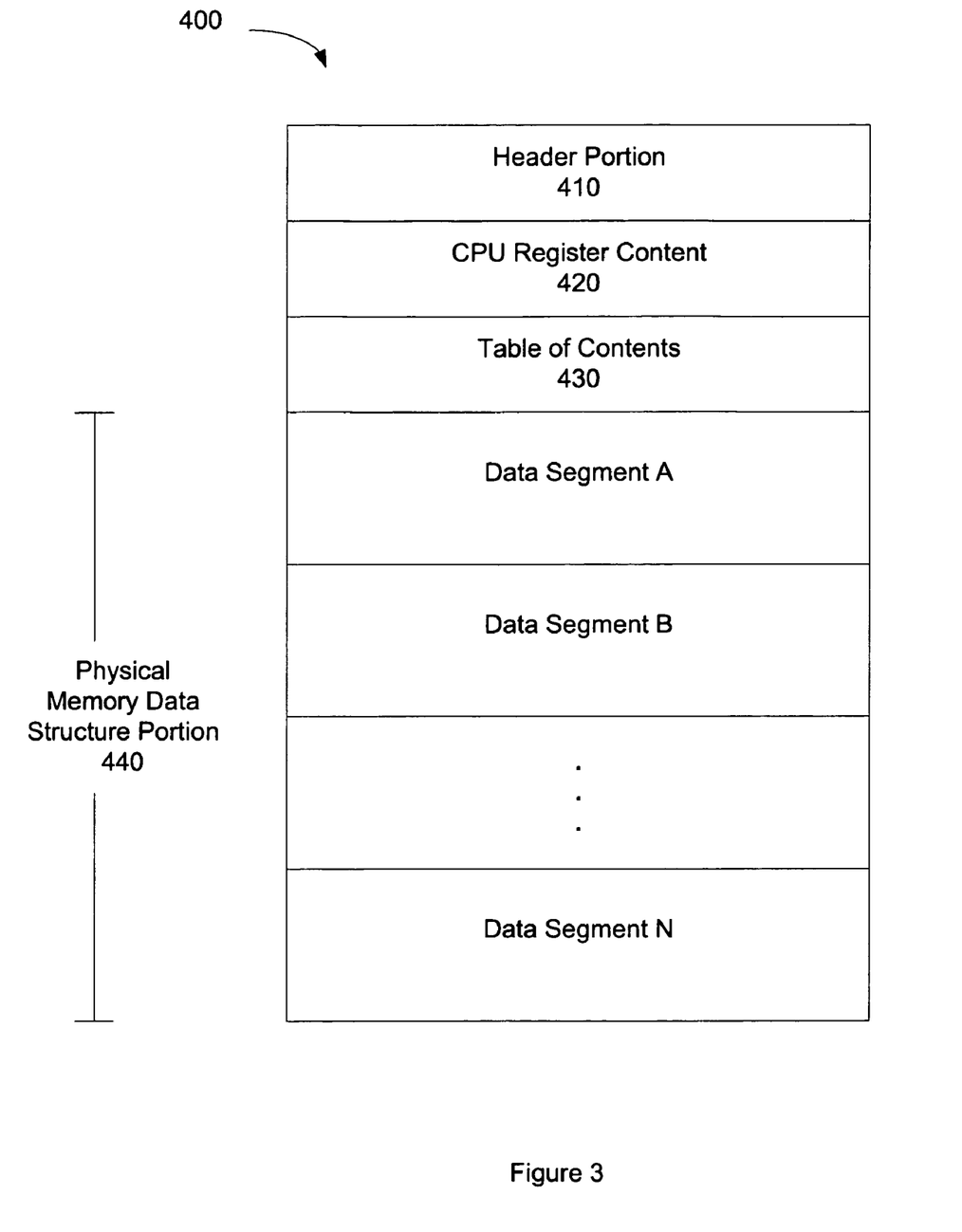
FIG. 3 illustrates an embodiment of a lightweight core file according to certain embodiments of the invention.
Figure 4:
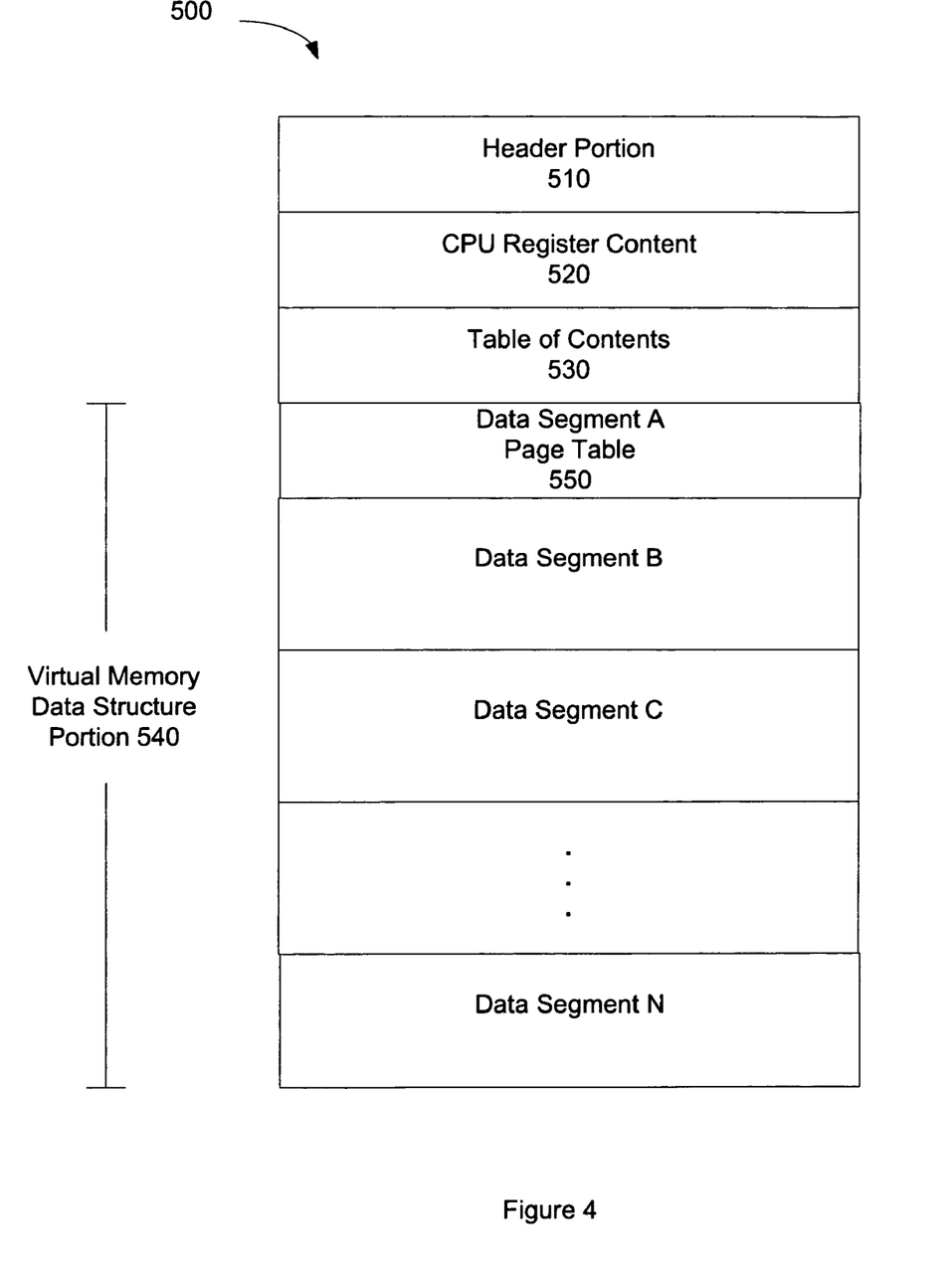
FIG. 4 illustrates an embodiment of a lightweight core file according to certain embodiments of the invention.

According to certain embodiments, a lightweight core file contains the contents of the processor registers, as well as certain contents of either the physical memory 320 or the virtual memory 330, as described with references to FIGS. 3 and 4 respectively.

In certain embodiments, the memory segments (virtual or physical) that are included in a lightweight core file are initially stored in a pre-allocated core dump compression memory segment in one or more temporary storage areas, such as temporary storage areas 200. The lightweight core file can also be compressed before being stored in the pre-allocated area. A computer system may have to use its processor exclusively to write the memory in this memory segment. The stored segments are subsequently written to permanent storage areas 350, such as disk, by the file system. In this way, any interruption in processing by the computer system is reduced because writing the information to disk at the time of creation of the micro-core, as is done in the case of a core file, is much slower than writing the information to a temporary storage area, such as in cache 220.

FIG. 3 illustrates a block diagram of an example of a lightweight core file 400 in accordance with certain embodiments of the present invention. Lightweight core file 400 contains a referencing or header portion 410, the content 420 of processor registers, a table of contents 430, and physical memory data structure portion 440 containing data segments A-N.

The header portion 410 may contain identification information, such as operating system version, a lightweight core number, a version number identifying the layout of the lightweight core file, a digital signature, a time date stamp, etc. The header 410 may also include the name or a code identifying an engineer/debugger/analyst requesting the lightweight core file. According to certain embodiments of the invention, the header portion 410 is about 100-200 bytes long.

The lightweight core file 400 contains a copy 420 of the processor registers. In this way, the lightweight core file 400 contains valuable information such as, certain execution states of currently running code, variable values, and so forth. In certain embodiments, the processor is instructed to copy out the processor registers when generating the lightweight core file 400. The processor register content portion 420 does not add much memory space to the lightweight core file 400. Typically, the processor register content portion 420 is only about 1 Kbyte in size. In this way, the micro-code file 400 contains information that can be very useful in debugging without requiring too much memory space.

The table of contents 430 provides references to specific data structures within the physical memory data structure portion 430. In certain embodiments, the table of contents 430 contains a two dimensional array which includes an offset value and a length value for each data segment in the physical memory data structure portion 430. The offset value indicates the location of the data segment, while the length value indicates the length of the data segment in the lightweight core file. The table of contents 430, thus, contains two integers each for every data segment in the physical memory data structure portion 430, and is therefore, typically less than a kilobyte in size.

The lightweight core file 400 also contains a physical memory data structure portion 440 containing data segments A-N. According to certain embodiments of the present invention, the data segments A-N are selected from physical memory of the machine by software routines (hereinafter referred to as "lightweight core routines") that cause certain data to be copied into the lightweight core file 400. The lightweight core routines can be added to already existing software code. In general, the lightweight core routines can be added to already existing software code to obtain information that would be useful for debugging. The lightweight core routines can be added, for instance, to certain software code that is determined to have a tendency to cause failures. The lightweight core routines gather user specified regions in memory and some standard regions, both especially selected for use in debugging.

This selective approach to data gathering is very useful not only in cases where there is a failure, but also in cases where there might be a failure. Examples of data in the physical memory data structure portion 440 for a storage server system include, data regarding corrupted inode data structure, a specific number of inode data structures surrounding the corrupted inode, process stacks, a copy of a corrupted operating system buffer, a specific number of operating system buffers surrounding the corrupted buffer, etc. Further, in certain embodiments, one or more stacks are also included in the data structure portion 440. Stacks often contain valuable context information. For instance, an execution stack may store local variables, called functions, and so forth. In this way, the execution stack provides an execution context.

Lightweight core file 400 thus contains a lot of information that is relevant to debugging and monitoring of a machine, while still being lightweight in size. The reduction in size comes not only from selectively including data segments in the data structure portion (instead of simply copying the entire working state of physical memory as in a complete core file), but also by not including several large components of a typical core file. For instance, complete core files often include a large symbol table file, which is a table having human readable references to the data residing in the physical memory.

Additionally, the lightweight core file 400 does not include a page table. Main memory contains a page table containing one entry for each physically configured page of memory. Each page table entry describes the location and the current state of its associated page as the system manipulates it. These data structures allow the operating system to maintain information as to the mapping or translation of every virtual address to a physical page of memory.

FIG. 4 illustrates a block diagram of an example of a lightweight core file 500 in accordance with certain embodiments of the present invention. Lightweight core file 500 contains a referencing or header portion 510, the content 520 of processor registers, a table of contents 530, a mapping table 550 and virtual memory data structure portion 540 containing data segments A-N.

The header portion 510 may be substantially similar to the header portion 410 of lightweight core file 400. Also, like lightweight core file 400, the lightweight core file 500 contains a copy 520 of the processor registers. Furthermore, like lightweight core file 400, lightweight core file 500 contains a table of contents 530 consisting of an offset value and a length value for each data segment in the virtual memory data structure portion 530.

However, unlike lightweight core file 400, the lightweight core file 500 contains a virtual memory data structure portion 540 containing data segments A-N. According to certain embodiments of the present invention, the lightweight core file 500 can exploit the fact that non-contiguous areas in physical memory correspond to contiguous area in a virtual memory space. Thus, multiple physical memory data segments can be replaced with fewer virtual memory data segments. Therefore, in certain embodiments, the lightweight core contains copies of data segments from the virtual memory. The specific data segments residing in the specific data segment portion 540 are contiguous data segments extracted from the Memory Management Unit's virtual memory or a virtual mapping constructed especially for the purpose of saving contiguous regions. The data segments are ideally suited for fault isolation of the machine.

Also, unlike lightweight core file 400, the lightweight core file 500 contains a mapping table 550 as data segment A that provides information for decoding and mapping between virtual memory addresses and the actual physical memory address. The mapping table 550 maps the virtual addresses of the data segments B-N in the virtual memory data structure portion 540 to their corresponding addresses in physical memory. The mapping table 550, thus, provides an extra layer of indirection. Virtual-to-physical address translation and physical-to-virtual address translation is well known to those skilled in the art. The mapping table 550 does not add much in terms of size to the lightweight core file 500 because it only contains mapping information for the data segments in the data structure portion 540, unlike a page table typically included in the complete core file which contains mapping information for all of physical memory. Furthermore, in certain embodiments, the lightweight core file contains coding that can be used to determine which engineer/service technician to route the lightweight core file to for debugging.

Figure 5:
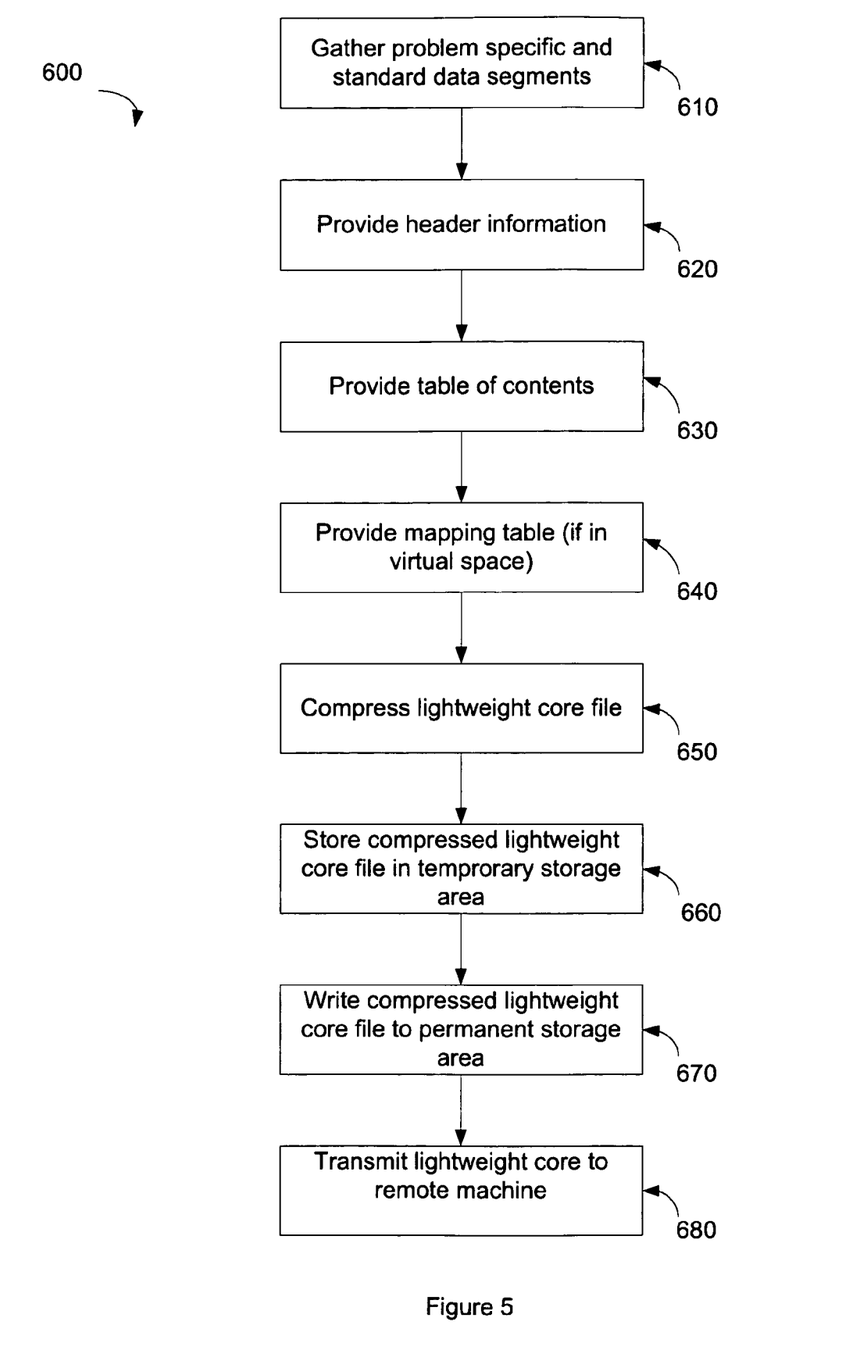
FIG. 5 illustrates a flow diagram of a process for generating a lightweight core file according to certain embodiments of the invention.

FIG. 5 illustrates a flow diagram of a process 600 for generating a lightweight core file according to certain embodiments of the invention. The process may be performed by, for example, code included in an operating system of the machine. At block 610, the process 600 gathers data segments to make up the data structure portion of the lightweight core file. The process 600 gathers both user specified regions in memory and some standard regions, both especially selected for use in debugging. For instance, in all cases which result in generation of a micro-core file, certain standard regions, such as CPU registers, execution stacks, etc., may be dumped. Further, certain user specified regions in memory may also be dumped. Further, certain regions specific to the problem area may be dumped. Such regions may be dumped by inserting software routines in file system code. For instance, code to generate a light-weight core file may be inserted in file system operations that tend to or may result in problems. The code may be tailored to gather desired memory regions. For instance, software routines may identify the neighboring inodes of a corrupted inode to be saved.

As discussed, the data segments may either be in physical memory space or in a virtual memory space. Also, contents of the CPU registers are also gathered. The data collection can occur upon a fault in the machine or even when no fault has occurred.

At block 620, the process 600 generates header information for the lightweight core file. At block 630, the process 600 generates a table of contents for the lightweight core file.

In certain embodiments, the table of contents contains an offset of the data segments in the data structure portion in the micro-file and the size information for each data segment. At block 640, the process 600 generates a page table to map virtual addresses to physical addresses if the data segments are in the virtual space.

At block 650, the process 600 compresses the lightweight core file, if desired. In certain embodiments, the lightweight core file is compressed only if its size exceeds a set threshold. At block 660, the process 600 stores the compressed lightweight core file in a pre-allocated area in temporary memory. This is done because writing to a temporary memory region (e.g., temporary storage areas 200 in FIG. 2) is generally much quicker than writing to a permanent storage area (e.g., areas 250 in FIG. 2). At block 670, the stored lightweight core file is written to a permanent storage area, such as to the hard drive. In certain embodiments, the stored lightweight core file is written to a permanent storage area when doing so will not interfere with or interrupt other processes running on the machine. At block 680, in certain embodiments, the lightweight core file may be transmitted to a remote machine.

Figure 6:
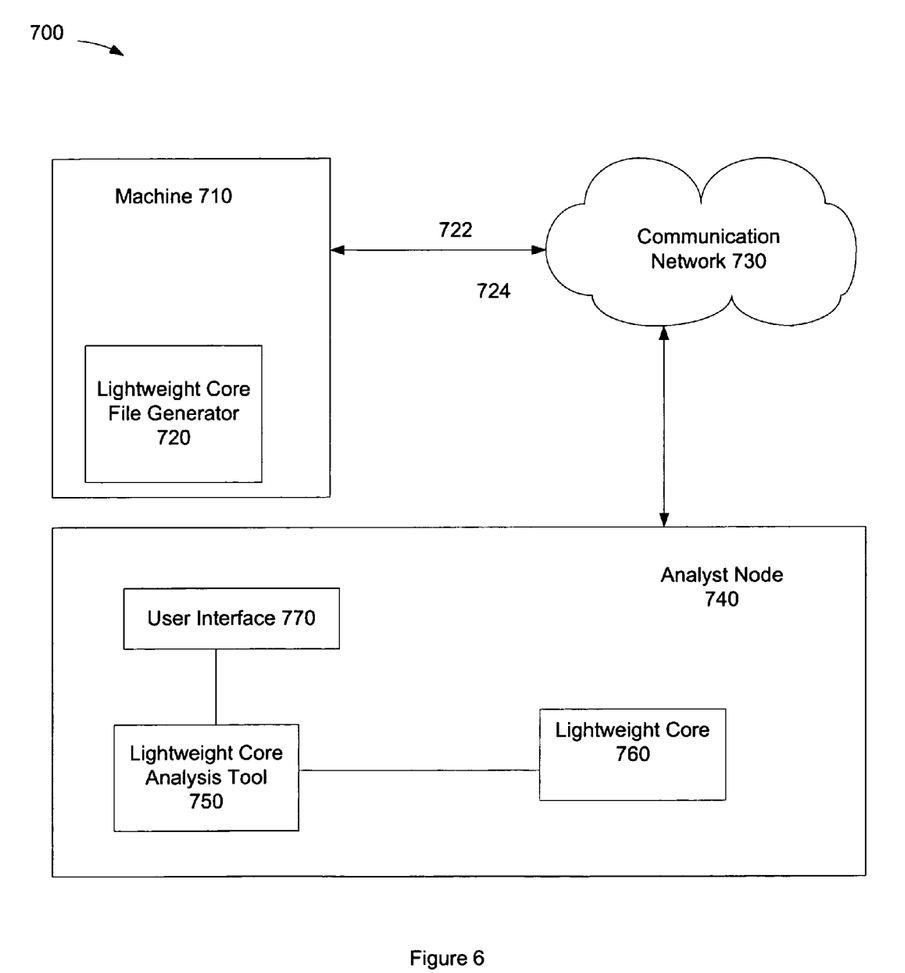
FIG. 6 illustrates a block diagram of a computer system in accordance with an environment of the present invention.

FIG. 6 illustrates a client/server embodiment of a lightweight core analysis system 700 according to certain embodiments of the present invention. Note, however, that the core analysis system 700 may be implemented in computer systems that do not have a client-server architecture, such as peer-to-peer computer systems.

As illustrated, the analysis system 700 includes a computer system 710 which may be any well-known type of computer system designed to execute software programs, such as one or more servers and memory devices executing user software and an operating system. The client computer system 710 is a computer system that is a monitored or targeted system for debugging and system analysis. The client computer system 710 includes lightweight core file generation component 720 to create a lightweight core file that can be analyzed within the analysis system 700 to identify bugs. The lightweight core file generation component 720 is a crash dump component that operates to generate a lightweight core file without generating a complete core file. The lightweight core file generation component 720 may be in the form of compiled executable code, although in other embodiments it can be in the form of hardware (e.g., specially-designed circuitry) or a combination of hardware and software. The lightweight core file generation component 720 may also implement a compression routine to compress the lightweight core file. Also, the lightweight core file generation component 720 may contain code or implement other methods to write the compressed lightweight core to a pre-allocated area in temporary memory of the computer system 710. The compressed lightweight core can subsequently be written to a permanent storage area on the machine, such as to disk.

The client computer system 710 is in communication with an analyst node 740 via communications links 722 and 724 and communications network 730. The communications network 730 may be the Internet, an Intranet, or other data communications network. Communication links 722 and 724 are data communications links, wired or wireless, that are selected to accommodate data transfer over and between the network 730, computer system 710, and the analyst node 740. Using these communication methods, the analyst node 740 is able to receive a lightweight core file from the client computer system 710. Of course, this information can be transferred in other non-network methods, such as transfer of a CD-ROM or other data storage device. Also, in other embodiments, the analyst node 740 and the client computer system 710 may be combined within the same computer or computer system (not shown).

The system 710 via its operating system (not shown) operates to create a lightweight core file 760 that contains relevant information about the existing state or context of executables or programs running on the operating system. The analyst node 740 typically includes memory to store the lightweight core file 760. In certain embodiments, to perform an online lightweight core dump, the analyst node 740 is operable in an online mode in which communications are open between the analyst node 740 and the client computer system 710.

According to an important feature of the invention, the analyst node 740 includes a core analysis tool 750 to provide analysis of the lightweight core file 760. The core analysis tool 750 may include a software application(s) executing within the analyst node 740. The analyst node 740 may also include a user interface 770 for interfacing with a core analysis tool 750 and the client computer system 710.

Figure 7:
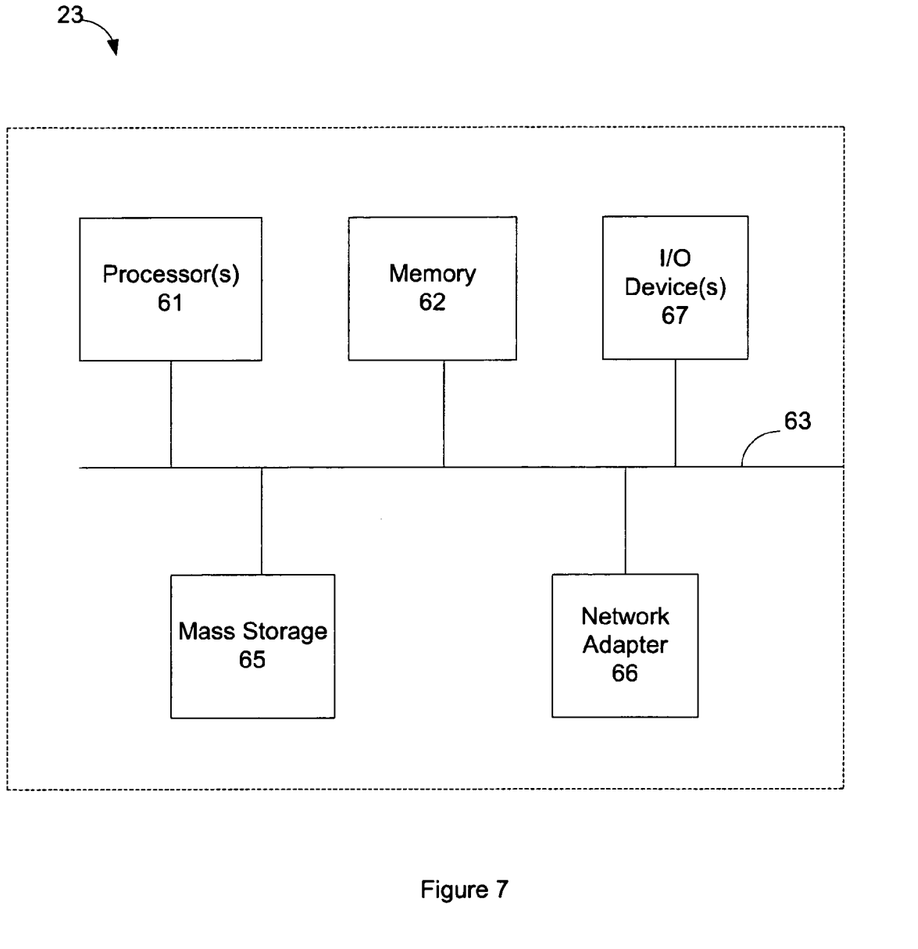
FIG. 7 is a high-level block diagram of a processing system.

As indicated above, the techniques introduced herein can be implemented in software, either in whole or in part. FIG. 7 is a high-level block diagram showing an example of the architecture of a processing system (e.g., a computer system), at a high level, in which such software can be embodied. In certain embodiments, the processing system 60 is a client computer system 710 that is a target for monitoring and/or debugging. In other embodiments, the processing system 60 is the analyst node 740. Note that certain standard and well-known components which are not germane to the present invention are not shown.

The processing system 60 includes one or more processors 61 and memory 62, coupled to a bus system 63. The bus system 63 shown in FIG. 6 is an abstraction that represents any one or more separate physical buses and/or point-to-point connections, connected by appropriate bridges, adapters and/or controllers. The bus system 63, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 61 are the central processing units (CPUs) of the processing system 60 and, thus, control its overall operation. In certain embodiments, the processors 61 accomplish this by executing software stored in memory 62. A processor 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 represents any form of random access memory (RAM), read-only memory (ROM), flash memory, or the like, or a combination of such devices. Memory 62 includes the main memory of the processing system 60. Memory 62 may store software which implements the techniques introduced above.

Also connected to the processors 61 through the bus system 63 are one or more internal mass storage devices 65, and a network adapter 66. Internal mass storage devices 65 may be or include any conventional medium for storing large volumes of data in a non-volatile manner, such as one or more magnetic or optical based disks. The network adapter 66 provides the processing system 60 with the ability to communicate with remote devices (e.g., clients 1) over a network and may be, for example, an Ethernet adapter, a Fibre Channel adapter, or the like. The processing system 60 may also include one or more input/output (I/O) devices 67 coupled to the bus system 63. The I/O devices 67 may include, for example, a display device, a keyboard, a mouse, etc.

The processing system 60 may also be a storage server. Accordingly, the above-mentioned technique can be implemented (or in conjunction with) a storage server in a storage server, such as one of the various models of Filers made by Network Appliance, Inc. (NetApp®) of Sunnyvale, Calif.

Thus, a method and apparatus for creating lightweight fault analysis records have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system comprising:
 a crash dump component operable to generate a lightweight core file without generating a complete core file, the lightweight core file comprising regions in memory specific to a problem of a machine, wherein the lightweight core file is smaller in size than the complete core file and includes a copy of contents of processor registers of the machine, and wherein the lightweight core file comprises header information including routing information for routing the lightweight core file to an analyst.

2. The system recited in claim 1, wherein the lightweight core file comprises references residing in a first referencing portion of the lightweight core file, the references providing location and offset information for specific data structures residing in a data structure portion within the lightweight core file.

3. The system recited in claim 2, wherein the lightweight core file comprises a data structure portion, the data structure portion comprising selected data segments from physical memory of the machine.

4. The system recited in claim 3, wherein the lightweight core file comprises a data structure portion, the data structure portion comprising selected data segments from a virtual memory mapping of the machine.

5. The system recited in claim 4, wherein the lightweight core file further comprises references residing in a second referencing portion of the lightweight core file, the references providing virtual to physical address mapping information for the data structures residing in a data structure portion.

6. The system recited in claim 1, the crash dump component being comprised of compiled executable code.

7. The system recited in claim 6, wherein the crash dump component is operable to gather data relating to a failure in the machine.

8. The system recited in claim 1, the crash dump component residing at the machine, such that the crash dump component can be executed at the machine where a fault has occurred and the lightweight core file can be generated at machine, the lightweight core file being transferable to a remote machine.

9. The system recited in claim 1, further comprising:
a compression component configured to compress the lightweight core file.

10. The system recited in claim 9, further comprising:
a storage component configured to copy the compressed lightweight core file in a pre-allocated temporary storage area in a main memory of the machine.

11. A method comprising:
generating a lightweight core file without generating a complete core file to debug a problem of a machine, the lightweight core file having a data structure portion; and
providing the data structure portion with areas of memory that are specific to the problem,
wherein the lightweight core file is smaller in size than the complete core file and includes a copy of contents of processor registers of a machine, and wherein the lightweight core file comprises header information including routing information for routing the lightweight core file to an analyst.

12. The method recited in claim 11, further comprising:
providing the data structure portion with contents of processor registers of the machine.

13. The method recited in claim 12, wherein the data structure portion comprises selected data segments from physical memory of the machine.

14. The method recited in claim 12, wherein the data structure portion comprises selected data segments from virtual memory of the machine.

15. The method recited in claim 14, further comprising:
providing the lightweight core file with a second referencing portion to provide virtual to physical address mapping information for the data segments in the data structure portion.

16. The method recited in claim 15, further comprising:
providing the lightweight core file with a header portion.

17. The method recited in claim 16, wherein the header portion comprises the routing information for routing the lightweight core file to the analyst.

18. The method recited in claim 11, further comprising:
providing the lightweight core file with a first referencing portion for providing location and offset information for specific data segments residing in the data structure portion.

19. The method recited in claim 11, further comprising:
compressing the lightweight core file.

20. The method recited in claim 19, further comprising:
copying the compressed lightweight core file in a pre-allocated temporary storage area in a main memory of the machine.

21. The method recited in claim 11, wherein the lightweight core file is generated upon a fault occurring on the machine.

22. A storage server comprising:
a plurality of processors;
a communication interface through which to communicate with a set of clients;
a storage interface through which to communicate with a storage subsystem containing data stored by the storage server on behalf of the clients; and
logic which causes the storage server to
generate a lightweight core file without generating a complete core file to debug a problem, the lightweight core file having a data structure portion reflecting the state of only a portion of working memory on the storage server; and
provide the lightweight core file with areas of memory that are specific to the problem,
wherein the lightweight core file is smaller in size than the complete core file and includes a copy of contents of processor registers of the storage server, and wherein the lightweight core file comprises header information including routing information for routing the lightweight core file to an analyst.

23. A storage server as recited in claim 22, further comprising logic which causes the storage server to:
generate a first referencing portion for the lightweight core file to provide location and offset information for specific data segments residing in the data structure portion.

24. A storage server as recited in claim 22, wherein the data structure portion comprises selected data segments from physical memory of the machine.

25. A storage server as recited in claim 22, further comprising logic which causes the storage server to:
generate a second referencing portion for the lightweight core file to provide virtual to physical address mapping information for data segments selected from virtual memory in the data structure portion.

26. A storage server as recited in claim 22, further comprising logic which causes the storage server to:
store the lightweight core file in a pre-allocated temporary storage area in a main memory of the machine.

* * * * *